United States Patent [19]

Anderson et al.

[11] 4,342,488
[45] Aug. 3, 1982

[54] SELF-ALIGNING ROLLING CONTACT THRUST BEARING/VIBRATION REDUCER ELEMENT

[75] Inventors: Hugh G. Anderson, Severna Park; Philip J. Hatchard, Annapolis, both of Md.

[73] Assignee: The United States of America as represented by the Secretary of the Navy, Washington, D.C.

[21] Appl. No.: 52,892

[22] Filed: Jun. 28, 1979

[51] Int. Cl.³ .................... F16C 17/06; F16C 19/34
[52] U.S. Cl. .................................. 308/15; 308/160; 308/168; 308/174; 308/187
[58] Field of Search .............. 308/9, 37, 135, 160, 308/168, 174, 187, 187.1, 184 A, 219, 232, 234, 240, DIG. 2, 15

[56] References Cited

U.S. PATENT DOCUMENTS 3,761,151 9/1973 Kerr .......................... 308/160
3,826,544 7/1974 Anderson et al. ............. 308/160

Primary Examiner—Frederick R. Schmidt
Attorney, Agent, or Firm—R. S. Sciascia; Luther A. Marsh; W. W. Randolph

[57] ABSTRACT

A self-aligning, vibration reducing marine thrust bearing assembly for use with a propulsion shaft having spaced bearing flanges. The assembly includes a journal bearing sleeve enclosing the shaft and a stationary housing radially spaced from the journal bearing with pivoting means extending therebetween for accommodating any misalignment of the shaft and journal bearing within the housing. An annular fluid containing cavity is formed in the housing adjacent each flange with an annular bearing piston pivotally disposed therein, wherein sealing elements are positioned between the cavity walls and the piston to maintain a fluid seal therebetween. Tapered roller bearings are disposed between each annular bearing piston and each shaft flange raceway.

12 Claims, 4 Drawing Figures

SELF-ALIGNING ROLLING CONTACT THRUST BEARING/VIBRATION REDUCER ELEMENT

The invention described herein may be manufactured and used by or for the Government of the United States of America for governmental purposes without the payment of any royalties thereon or therefor.

BACKGROUND OF THE INVENTION

This invention relates to thrust bearing assemblies and more particularly to vibration reducing, self-aligning thrust bearing assemblies used in large capacity marine propulsion systems.

Various thrust bearing arrangements have been proposed for reducing vibration and misalignment problems occurring during transmission of thrust loads in marine propulsion systems. For example, hydrodynamic or "Kingsbury" pivoted-pad type of bearing assemblies are widely employed in large marine vessels to transmit forward and aft thrust loads from a propulsion shaft to the thrust bearings and ultimately to the hull structure. A "Kingsbury" bearing commonly includes a stationary housing surrounding the shaft, a radially projecting thrust flange formed on the shaft, and forward and aft bearing pads positioned between the thrust flange and the housing. A plurality of hydraulically supported piston elements have been used between the forward and aft bearing pads and the bearing housing to more uniformly distribute thrust forces applied to the housing. Further, propeller induced vibrations are reduced by the damping properties of the hydraulic fluid and other design provisions of the hydraulic system supporting such pistons. However, "Kingsbury" type hydraulic thrust bearings have common disadvantages in requiring somewhat greater starting torques than other types of bearing assemblies and having reduced piston life due to galling and seal wear in the piston assemblies. Such seal wear and piston galling are caused by shaft misalignment and uneven bearing pressure distribution, which also reduces the effectiveness of the piston as a vibration reducer.

Roller bearings have been used in various marine bearing assemblies to lower the starting and frictional torque characteristics of a selected bearing assembly. However, misalignment of the bearings often imposes various sliding motions in the bearings themselves, which tends to reduce the bearing life. To overcome reduced bearing life encountered with these bearings, tapered roller bearings have been employed, as exemplified by U.S. Pat. No. 3,826,544 granted to Anderson.

The thrust bearing assembly constructed according to the present invention is designed to overcome various problems encountered with the prior art, such as reduced piston wearability. For example, an annular piston of the present invention is uniformly supported in a fluid cavity to reduce the effects of concentrated and eccentric thrust loads placed on the bearing elements, even where the shaft and its bearing flange are misaligned with respect to the housing.

SUMMARY OF THE INVENTION

A general purpose of this invention is to provide a self-aligning, vibration reducing thrust bearing particularly adapted to compensate for misalignment between a propulsion shaft and a fixed housing. The bearing assembly generally comprises a journal bearing encircling the shaft, a housing radially spaced from the journal bearing, means pivotally interconnecting the housing and journal bearing for permitting pivotal movement therebetween, and bearing means for transmitting thrust loads between the shaft and housing while compensating for misalignment of the elements.

Bearing means, in the form of a tapered roller bearing positioned between a vibration reducing bearing raceway mounted on a projecting shaft flange and an annular piston fluidically supported in a housing cavity, transmits thrust loads between the flange and housing. The annular piston is axially and pivotally positionable within the cavity upon pivotal movement of the shaft and journal bearing. Seal means positioned between the annular piston and the housing walls defining the cavity maintain a fluid seal when the annular piston is axially and pivotally displaced therein. Further, not only does the annular piston uniformly transmit thrust forces between the shaft flange and the housing but the hydraulic system also dampens vibrational forces transmitted thereto. Additionally a bearing raceway can be mounted on the shaft flange in a manner to reduce vibrations as well as prevent radial displacement of the tapered roller bearing elements.

Means pivotally interconnecting the housing to the journal bearing, in the form of interfitting ridge and rib means, permits pivotal movement of the journal bearing relative to the housing while preventing axial displacements therebetween. Oil supply conduits span the clearance space between the sleeve type journal bearing and the housing, and extend through the respective ridge and rib means for supplying lubricating oil to the propulsion shaft.

Accordingly, it is a general object of this invention to provide a self-aligning, vibration reducing marine thrust bearing which will automatically compensate for misalignment between various bearing elements.

Another object of the present invention is to provide a novel and improved thrust bearing assembly which can be inexpensively manufactured and repaired, has a long useful life and is relatively efficient.

Still another object of this invention is to provide a bearing assembly wherein adequate provision is made for the equalization of thrust pressure on the bearing elements without adversely affecting the load carrying performance of same.

Yet another object of this invention is the provision of a bearing assembly wherein radially mounted bearing elements are mounted to provide a compact bearing assembly which can be readily serviced.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings in which:

DETAILED DESCRIPTION OF THE DRAWINGS

Figure 1:
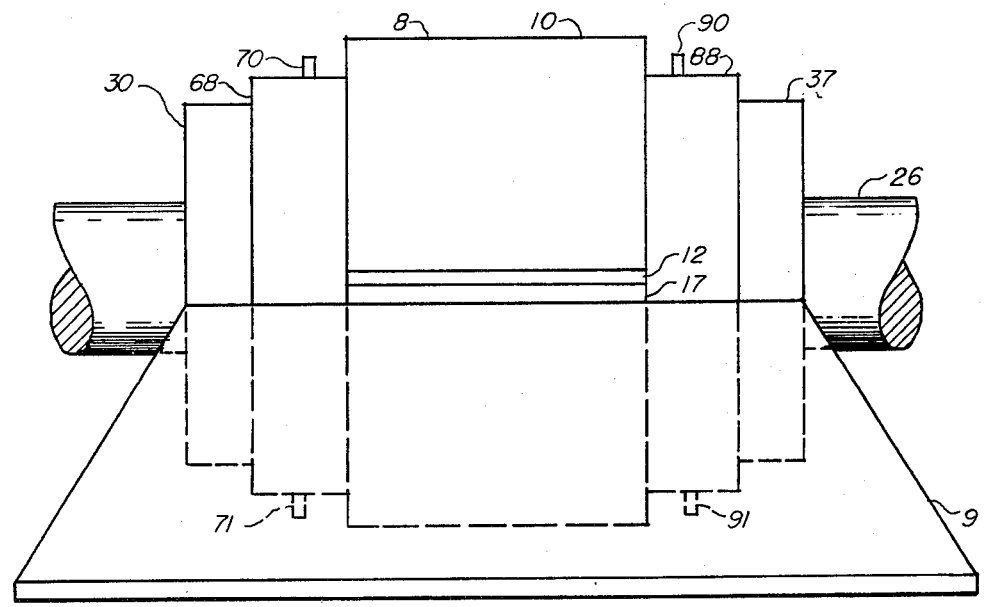
FIG. 1 is a side view of the bearing assembly with a support structure attached thereto.
Figure 2:
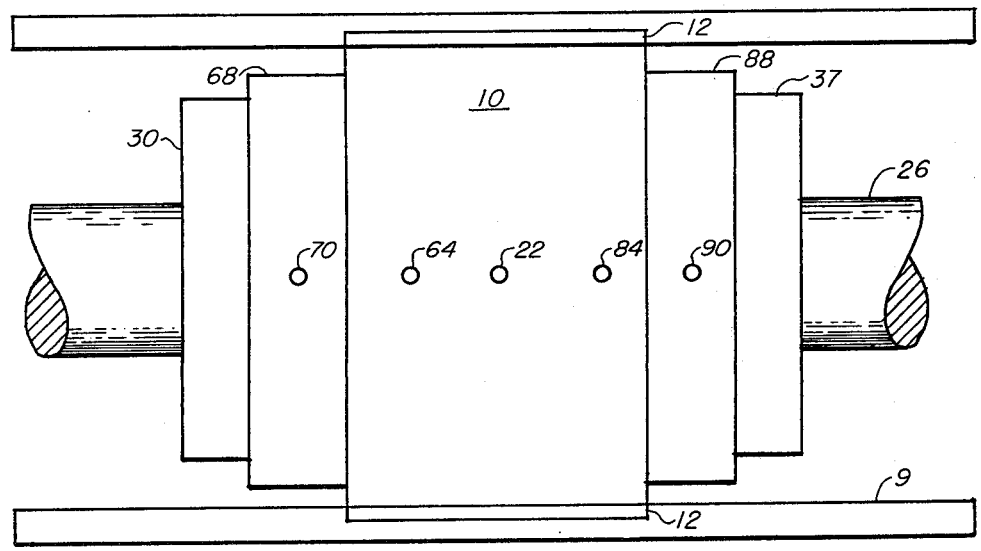
FIG. 2 is a top view of the bearing assembly of FIG. 1.

The new and improved bearing configuration of the present invention may be applied to propulsion shafts designed to accommodate axial thrust in both axial directions. Referring first to FIGS. 1 and 2, which generally show a bearing housing 10 attached to a superstructure by spaced supports 9, the propulsion shaft 26 of the bearing assembly 8 is provided with a pair of spaced thrust flanges 30, 37 which may be separately keyed to or otherwise attached to the shaft 26. Interposed between inner faces 31, 38, as shown in FIG. 3, of the thrust flanges 30, 37 is the housing 10, a sleeve type journal bearing 45 and other bearing elements of the present invention.

Figure 3:
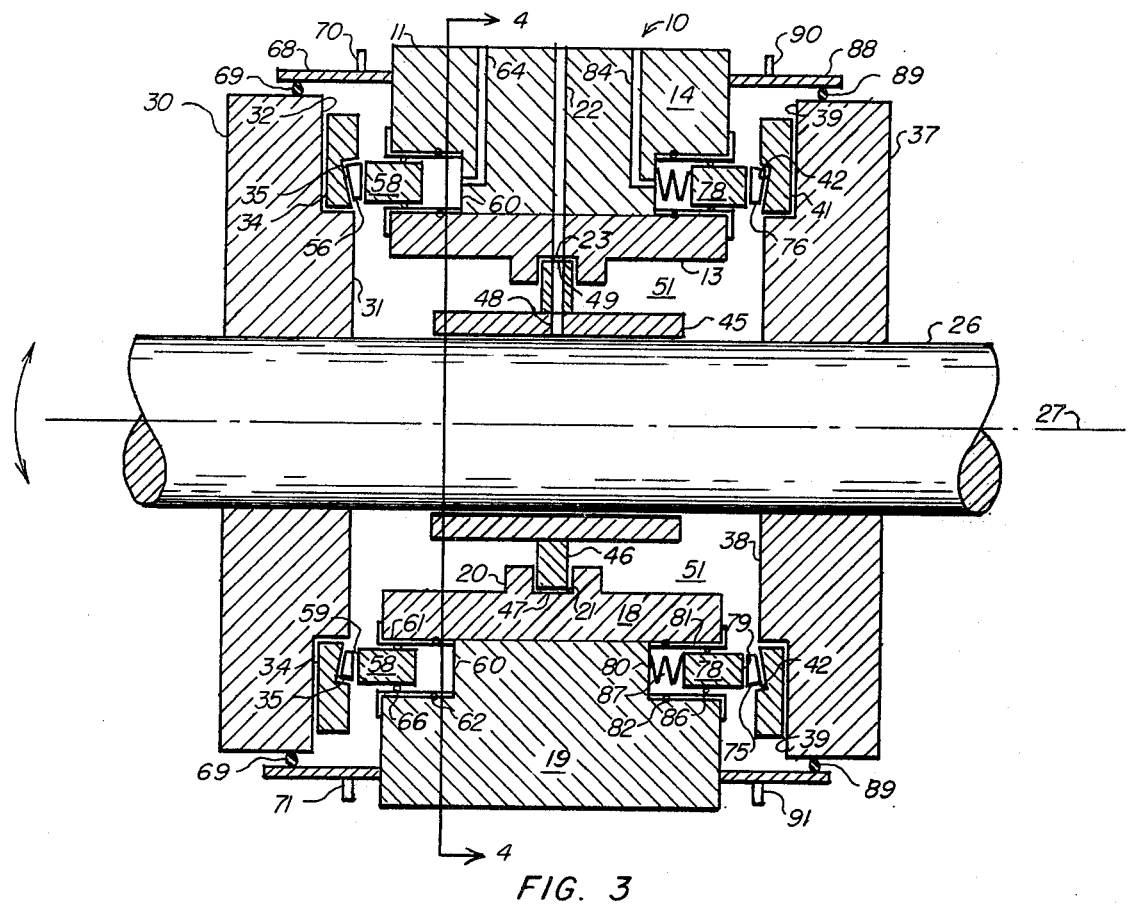
FIG. 3 is an enlarged cross-sectional view of the bearing assembly wherein the support structure has been removed therefrom.
Figure 4:
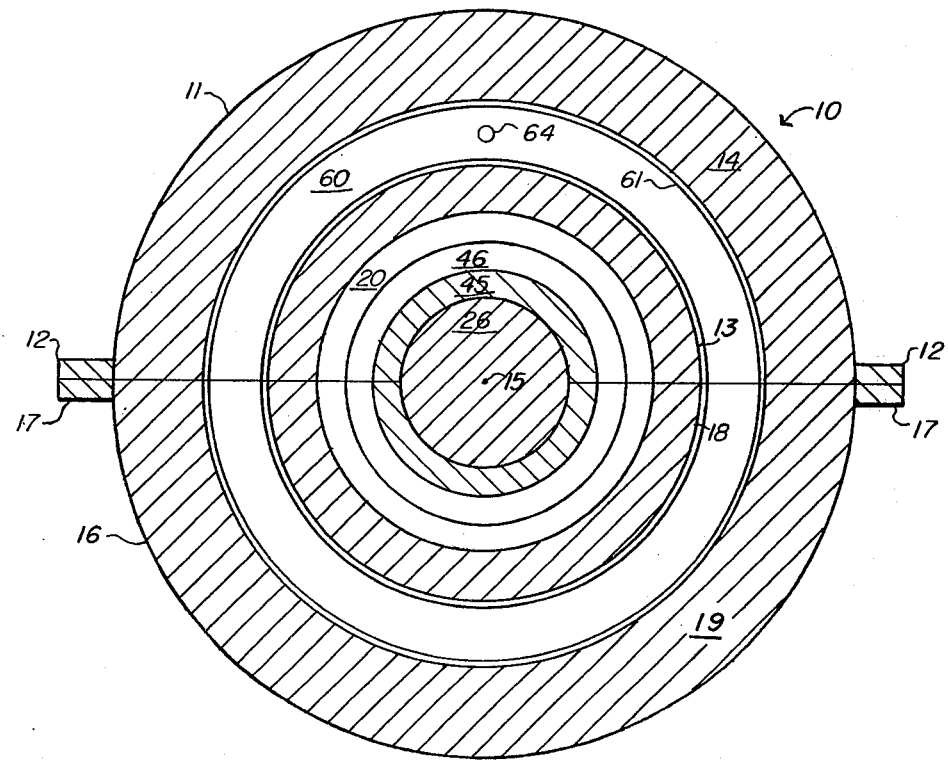
FIG. 4 is a sectional view of the device as viewed in the direction indicated by line 4—4 of FIG. 3, with the support structure removed therefrom.

The housing 10, as shown in FIGS. 3 and 4, includes an upper semicircular part 11 suitably attached to a lower semicircular part 16 by bolts or the like passing through radially projecting flanges 12, 17, which also facilitate the attachment of the housing 10 to the supports 9. Further, semicircular parts 11, 16 are respectively formed of inner journal bearing shells 13, 18 attached to outer casings 14, 19. The construction as illustrated has the further advantage that access may be gained to the interior portion of the housing by removing one of the semicircular portions 11, 16. Additionally, when properly mounted around the shaft, the longitudinal axis of the housing, as represented by point 15 in FIG. 4, will be generally parallel and coaxial with the axis 27 of the shaft 26.

A sleeve-type journal bearing 45 for supporting the shaft 26 is longitudinally positioned between the shaft flanges 30, 37 and radially positioned between the shaft 26 and the housing 10 such that a clearance space 51 is defined between the inner surface of the housing 10 and the outer surface of the journal bearing 45. The journal bearing 45, which may be formed of two or more semicircular portions as shown in FIG. 4, slidingly encircles the exterior of the shaft 26 and includes a babbit metal liner to permit relative rotation of the shaft and journal bearing. Pivoting means in the form of interfitting ridge and rib means spans the clearance space 51 and interconnects the journal bearing 45 and the housing 10 for permitting pivotal movement of the shaft 26 and journal bearing 45 relative to the longitudinal axis 15 of the housing 10. The pivoting means preferably comprises a pair of spaced radial ridges 20 formed on the interior surface of the housing 10 and a radial rib 46 formed on the outer surface of the journal bearing 45 and disposed therebetween. With the extent of pivotal movement of the sleeve type journal bearing 45 being governed by the configuration of the interfitting pivoting means, the radial rib 46 is dimensioned to be narrower in width and of lesser diameter than the groove 21 defined between the spaced ridges 20.

Means for supplying lubricating oil between the journal bearing 45 and the shaft 26 include at least one lubricating conduit extending radially through the housing and the journal bearing. Housing conduit 22, as shown in FIG. 3, includes an orifice 23 opening into the groove 21 and the journal bearing conduit 48, which extends through the interior of the radial rib 46, is provided with an orifice 49 on the distal radial surface 47 of the rib 46. The rib orifice 49 may be larger than the housing orifice 23 so as to maintain the orifices in fluid communication as the rib 46 is axially and pivotally deflected within the spaced ridges 20. Upon pivotal movement of the journal bearing 45 and shaft 26, a circumferential fluid chamber is defined by the radial surface 47 of the rib 46 and the groove 21 such that the housing conduit 22 and orifice 23 will remain in fluid communication through such circumferential chamber with the journal bearing conduit 48 and orifice 49. Thus, if the housing orifice 23 is displaced somewhat axially and/or rotationally relative to the journal orifice 49, fluid communication will be maintained therebetween. Oil reservoir means of suitable design will be connected to the housing conduit 22 to supply sufficient oil, under pressure, to the journal bearing conduit and the lubricating space between the shaft 26 and journal bearing 45.

Forward thrust is transmitted from the flange 30 through a forward thrust bearing element 56 to a first or forward piston 58 retained in a first fluid cavity 60 formed in the housing 10. Subsequently, the thrust loads are transmitted from the housing 10 to the supports 9. Similarly, aft thrust is transmitted from flange 37 through an aft thrust bearing element 76 to a second or aft piston 78 supported in a second fluid cavity 80 formed in the housing 10 and subsequently from the housing 10 to the supports 9. One or both of the pistons 58, 78 are preferably of annular configuration and the respective conforming fluid cavities 60, 80 are annular channels designed to receive the pistons. Further, each piston is preferably a loose fit in the respective fluid cavity to allow for pivotal movement therein and such an arrangement permits the axial and pivotal positioning of the pistons 58, 78 within the respective cavities 60, 80 upon axial and/or pivotal movement of the shaft 26 about the housing axis 15. Additionally, a more uniform bearing pressure distribution is generally provided if the piston is generally concentric with the shaft 26. Inserts 61, 81 are provided in the cavities 60, 80 to furnish bearing surfaces for the piston and O-rings 62, 82 are provided between the inserts 61, 81 and the walls of the cavities 60, 80 to prevent leakage of hydraulic fluid. Seal means, in the form of an elastomer, for example, bonded to one or both of the pistons and cavities maintains a fluid tight seal between a piston and the respective cavity as the piston is axially and pivotally positioned within such cavity.

Means for maintaining a predetermined pressure on the pistons 58, 78 may include an oil supply means maintaining a preselected pressure on the pistons 58, 78 and also a spring means 87 disposed in the aft cavity 80 for imposing a biasing pressure which maintains the aft piston 78 in contact with the aft flange 37. The oil supply means, as shown in FIG. 3, include oil conduits 64, 84 connected to the forward and aft cavities 60, 80 wherein supply and reservoir means provide hydraulic fluid, under pressure, to each such conduit and cavity. Thus, the annular configuration of the cavities 60, 80 permits the application of a uniform pressure to the pistons 58, 78 and allows hydraulic dampening of vibrations transmitted to the pistons.

The inner faces 31, 38 of the forward and aft flanges 30, 37 include circumferential recessed portions 32, 39 designed to receive raceways 34, 41 mounted therein. Elastic layers are optionally formed between the respective flanges 30, 37 and raceways 34, 41 mounted therein to absorb and dampen vibrations transmitted therebetween. Additionally, the surfaces of the raceways 34, 41, which engage the bearing elements 56, 76, are designed to prevent radial displacement of the and its tapered roller bearing elements 56, 76 as the shaft is rotated. For example, grooves 35, 42 are formed in raceways 34, 41 to accommodate the tapered roller bearings 56, 76. The forward and aft bearing units, which are preferably formed of a plurality of tapered roller bearings 56, 76, are generally concentric with the axis 27 of the shaft 26 to uniformly distribute thrust loads applied to the pistons.

In this particular embodiment, the pistons have bearing faces 59, 79 which are maintained in a plane substantially normal to the axis 27 of the shaft 26 as the shaft is pivoted and displaced within the housing 10. Accordingly, the individual tapered roller bearings remain in linear contact with the raceways and piston bearing faces such that eccentric and concentrated loads thereon are reduced.

Lubrication for the thrust bearings is also supplied through housing covers 68, 88 which are attached to the housing 10 and span the gap between the housing 10 and the shaft flanges 30, 37 to form a fluid tight cavity therebetween. Housing cover seal means 69, 89 in the form of elastomeric elements maintain a fluid seal between the housing covers 68, 88 and the shaft flanges 30, 37 which rotate relative thereto. Such fluid enters through upper conduits 70, 90 near the top of the housing and is withdrawn through lower conduits 71, 91 positioned near the bottom of the housing 10.

Repair and servicing of the bearing assembly is facilitated by removal of either the housing elements or the flange elements.

In operation, misalignment of the various bearing elements is often due to pressurization of the hull structure. For example, misalignment in submarines is unavoidable since the bearing assembly is generally mounted to the pressure hull of a submarine. With the descent and ascent of a submarine from one depth to another, differential changes in the hydrostatic pressure causes the shaft to assume different relative positions with respect to the housing. Such differential movements are accommodated by the bearing assembly as generally shown in FIGS. 1-4. If, for example, under forward thrust conditions, the rotating shaft 26 is pivoted in a clockwise manner in the plane of FIG. 3, the forward rotating flange 30 presses the upper portion of piston 58, shown in FIG. 3 into the upper portion of the cavity 60 while the fluid pressure in such cavity 60 forces the outward displacement of the lower portion of piston 58 from the lower portion of the cavity 60. Similarly, the rotating aft flange 37 is positioned such that piston 78 shown in FIG. 3 is tilted in a clockwise direction in the plane of the drawing so that the portion of the piston 78 in the lower semicircular portion 11 of the housing 10 is pressed into the cavity 80. Spring means 87 may be used to bias the pistons 78 so that the bearing face 79 remains in contact with the individual roller bearings 76. In addition, journal bearing 45 is pivoted relative to the housing 10 with the radial rib 46 being secured in pivotal relationship between radial ridges 20.

Obviously many modifications and variations of this invention are possible in light of the above teachings. It is therefore to be understood that within the scope of the following claims the invention may be practiced otherwise than as specifically described.

What is claimed is:

1. A self-aligning thrust bearing assembly for a rotating shaft comprising:
   a journal bearing supporting the shaft;
   a housing having a longitudinal axis, said housing being radially spaced from said journal bearing and defining a clearance space therebetween, said housing being fixed to prevent rotational and pivotal displacements of said housing;
   means pivotally connecting said housing to said journal bearing for permitting pivotal movement of the shaft and journal bearing relative to said housing axis, said pivoting means comprising ridge means and a rigid rib element cooperating therewith to form a pivot therebetween; and
   bearing means positioned in contact with said housing and the shaft for transmitting thrust loads therebetween.

2. A self-aligning thrust bearing assembly for a rotating shaft comprising:
   spaced flanges attached to a shaft;
   a housing having a longitudinal axis, said housing being positioned between said flanges for receiving the thrust from said flanges;
   means for supporting said housing and for maintaining said housing in a fixed position;
   first and second annular cavities formed in said housing adjacent said spaced flanges;
   first and second annular pistons respectively disposed in said first and second cavities, said pistons being movable into and out of said cavities to automatically compensate for misalignment of the shaft relative to said housing;
   a forward bearing positioned in contact with one of said flanges and said first piston;
   an aft bearing positioned in contact with the other of said flanges and said second piston;
   a journal bearing supporting the shaft and positioned between the shaft and said housing; and
   means pivotally connecting said journal bearing to said housing for permitting pivotal movement of the shaft and said journal bearing relative to said housing, said pivoting means comprising a rigid radial rib formed on said journal bearing and a conforming groove for receiving said radial rib formed on said housing.

3. The bearing assembly of claim 2, wherein said first and second annular cavities are concentric with said shaft and said pistons are axially and pivotally positionable within respective said cavities upon pivotal movement of said shaft about said housing axis.

4. The bearing assembly of claim 3, further comprising fluid containing chambers defined by said cavities and respective said pistons and seal means disposed between each said piston and respective said cavity for maintaining a fluid seal therebetween.

5. The bearing assembly of claim 1, wherein said groove is formed by a pair of spaced radial ridges formed on said housing and said radial rib being formed on an outer surface of said journal bearing and disposed between said ridges.

6. The bearing assembly of claim 5, further comprising means for supplying lubricating oil between said journal bearing and said shaft, said oil supply means including lubricating conduits extending through said housing and said journal bearing, said housing conduit having an opening positioned between said ridges and said journal bearing conduit having an opening positioned on a circumferential surface of said radial rib, said openings being located in fluid communication with each other.

7. A thrust bearing assembly for a shaft comprising:

a journal bearing engaging a portion of the shaft;

a fixed housing having a longitudinal axis, said housing being radially spaced from the shaft;

means for transmitting thrust forces between the shaft and said housing; and means pivotally connecting said journal bearing to said housing for permitting pivotal movement of the shaft and said journal bearing relative to said housing, said pivoting means comprising a rigid radial rib formed on said journal bearing and a conforming groove for receiving said radial rib formed on said housing.

8. The thrust bearing assembly according to claim 7, wherein said thrust transmitting means comprises an annular cavity formed in said housing concentric with the shaft and an annular piston disposed in said cavity, said piston being axially and pivotally positionable within said cavity upon pivotal movement of the shaft about said housing axis.

9. The bearing assembly of claim 8, further comprising seal means for maintaining a fluid seal between said piston and said cavity upon such axial and pivotal movement of said piston in said cavity.

10. The bearing assembly of claim 9 further comprising an oil supply means for maintaining a predetermined pressure in said cavity.

11. The thrust bearing assembly according to claim 7, wherein said journal bearing comprises a sleeve encircling said shaft; and a clearance space is defined between said journal bearing and said housing for permitting pivotal movement of the shaft and said journal bearing about said housing axis and within said clearance space.

12. The thrust bearing assembly according to claim 11, wherein said radial rib is circumferentially formed on said journal bearing.

* * * * *